US012794122B2

(12) United States Patent
Zhu et al.

(10) Patent No.: US 12,794,122 B2
(45) Date of Patent: Nov. 10, 2026

(54) APERTURE-FED PATCH C-BAND ANTENNA ARRAY FOR ULTRA-DENSE MULTIBAND ANTENNAS

(71) Applicant: JOHN MEZZALINGUA ASSOCIATES, LLC., Liverpool, NY (US)

(72) Inventors: Jiaqiang Zhu, Baldwinsville, NY (US); Michael Devine, Colorado Springs, CO (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 170 days.

(21) Appl. No.: 18/863,573

(22) PCT Filed: Apr. 30, 2024

(86) PCT No.: PCT/US2024/026965
§ 371 (c)(1),
(2) Date: Nov. 6, 2024

(87) PCT Pub. No.: WO2024/228986
PCT Pub. Date: Nov. 7, 2024

(65) Prior Publication Data

US 2026/0261045 A1 Sep. 3, 2026

Related U.S. Application Data

(60) Provisional application No. 63/499,458, filed on May 1, 2023.

(51) Int. Cl.
*H01Q 21/26* (2006.01)
*H01Q 5/48* (2015.01)
(Continued)

(52) U.S. Cl.
CPC ............. *H01Q 5/48* (2015.01); *H01Q 9/0457* (2013.01); *H01Q 21/065* (2013.01); *H01Q 21/26* (2013.01)

(58) Field of Classification Search
CPC ........ H01Q 1/246; H01Q 5/48; H01Q 9/0457; H01Q 21/06–08; H01Q 21/26–28; H01Q 19/108
See application file for complete search history.

(56) References Cited

U.S. PATENT DOCUMENTS 11,901,638 B2 * 2/2024 Chainon ................ H01Q 9/285
12,113,291 B2 * 10/2024 Sun ........................ H01Q 1/246
(Continued)

*Primary Examiner* — Hasan Islam
(74) *Attorney, Agent, or Firm* — BRYAN CAVE LEIGHTON PAISNER LLP

(57) ABSTRACT

A multiband antenna array has a plurality of midband dipoles and a plurality of C-Band dipoles. The C-Band dipoles in clusters of four that surround a single midband dipole and these clusters are arranged in multiple columns. The C-Band dipoles are each disposed over a cruciform aperture formed in a metal layer that is disposed over a cavity formed of a cavity frame that has a plurality of vias that electrically couple to a ground plane. The cavity reflects energy radiated by the cruciform aperture toward the C-Band dipoles. The disclosed multiband antenna array enables dense placement of midband and C-band dipoles while mitigating any interband interference.

15 Claims, 16 Drawing Sheets

(51) Int. Cl.
*H01Q 9/04* (2006.01)
*H01Q 21/06* (2006.01)

(56) References Cited

U.S. PATENT DOCUMENTS

| | | | |
|---|---|---|---|
| 2016/0254594 | A1 | 9/2016 | Jones et al. |
| 2016/0285169 | A1 | 9/2016 | Shooshtari et al. |
| 2017/0062952 | A1 | 3/2017 | Sundararajan et al. |
| 2017/0125917 | A1* | 5/2017 | Lin .......................... H01Q 9/16 |
| 2018/0301801 | A1 | 10/2018 | Hojjat et al. |
| 2021/0249787 | A1 | 8/2021 | Schuss et al. |

* cited by examiner

APERTURE-FED PATCH C-BAND ANTENNA ARRAY FOR ULTRA-DENSE MULTIBAND ANTENNAS

CROSS-REFERENCE TO RELATED APPLICATIONS

This application is a National Stage Application of International Application No. PCT/US24/26965, filed on Apr. 30, 2024, which claims the benefit of U.S. Provisional Application No. 63/499,458, filed on May 1, 2023, all of which are incorporated by reference in their entirety herein.

BACKGROUND OF THE INVENTION

Modern cellular antennas typically operate in three frequency bands: low band (LB) (617-894 MHz), mid band (MB) (1695-2690 MHz), C-Band and CBRS (Citizens Broadband Radio Service) (3.4-4.2 GHz). Of these, the C-Band array is typically arranged in an 8T8R (Eight Transmit Eight Receive) configuration having multiple columns of radiators in an array to provide beamforming and beam steering in the azimuth plane. Further, the MB radiators are typically arranged in two columns whereby it is preferable for each column to have numerous radiators to enable beam tilt in the vertical plane.

A challenge arises in the design of multiband antennas in that there is pressure to minimize the area of the multiband antenna array to reduce wind loading. Accordingly, it is desirable to make the antenna array as dense as possible. However, placing the radiators of the three bands in close proximity causes interference between them. An example of such interference is between the MB radiators and the C-Band radiators. Conventional solutions to the MB/C-Band interference problem involve either truncating the MB array to keep the MB radiators at a distance from the C-Band array, or increasing the spacing between the MB and C-Band arrays. The former solution reduces the number of MB radiators in the antenna and thus limits the MB gain and beam quality, and the latter solution increases the size of the antenna, exacerbating its wind loading as well as increasing its weight.

Accordingly, what is needed is a MB and C-Band dipole design that allows for adjacent placement of the respective radiators without degrading performance of each.

SUMMARY OF THE INVENTION

Aspects of the present disclosure involve a multiband antenna array. The multiband antenna array comprises a reflector; a feed and cavity assembly mechanically coupled to the reflector; a plurality of first dipoles configured to radiate in a first frequency band, the plurality of first dipoles disposed on the feed and cavity assembly; and a plurality of second dipoles configured to radiate in a second frequency band, the plurality of second dipoles disposed on the feed and cavity assembly, the second frequency band being higher in frequency than the first frequency band, wherein each of the plurality of second dipoles has a patch antenna element that is disposed over a cruciform aperture, wherein the plurality of second dipoles are arranged in two columns and the plurality of first dipoles are arranged in a column that lies between the two columns of second dipoles.

DETAILED DESCRIPTION OF THE INVENTION

Figure 1A:
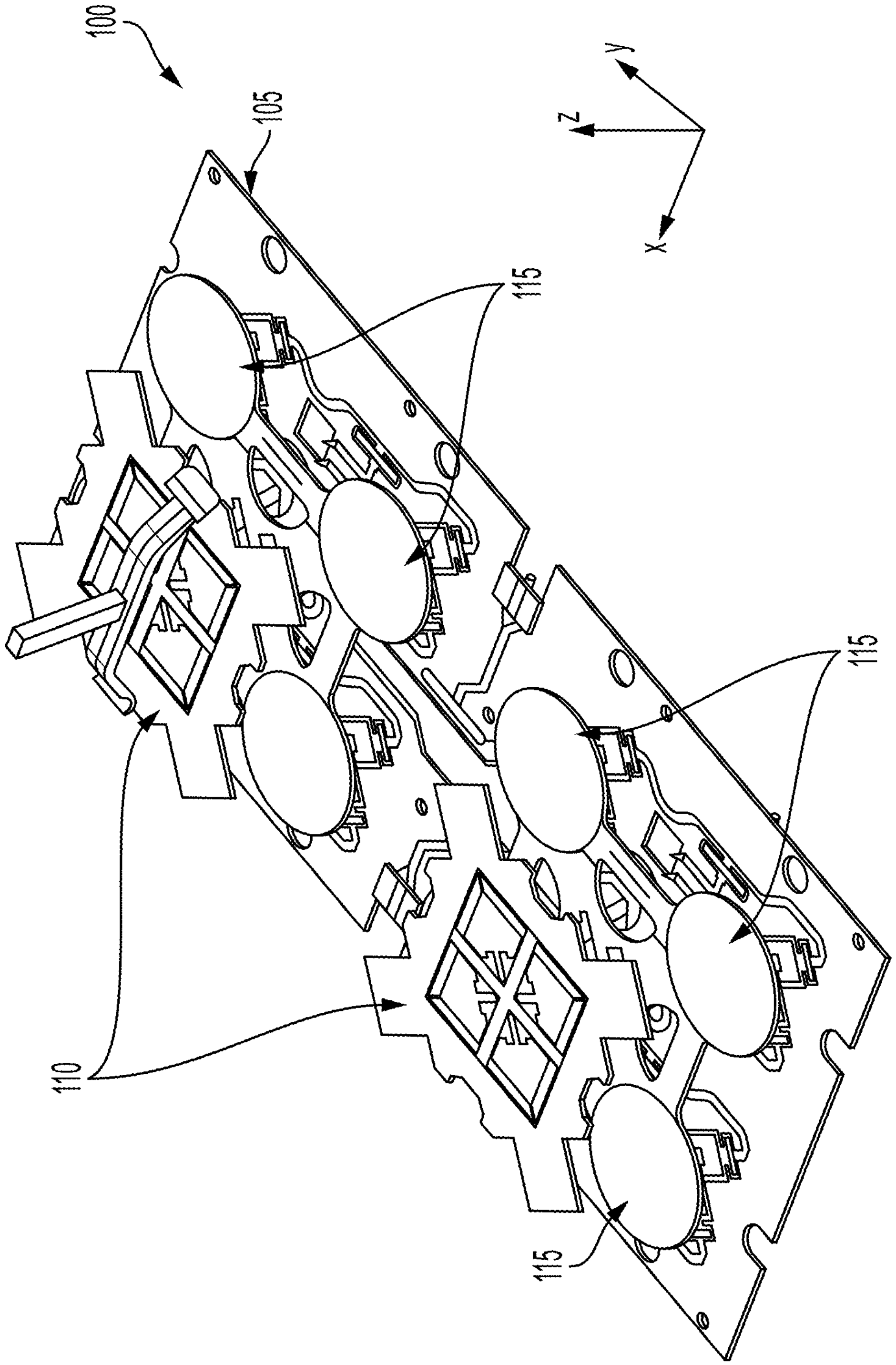
FIG. 1A illustrates an exemplary dual-band antenna array portion having a plurality of exemplary aperture-fed patches according to the disclosure.

FIG. 1A illustrates an exemplary dual-band antenna array portion 100 having a plurality of exemplary aperture-fed patches according to the disclosure. Array portion 100 has a feed and cavity assembly 105 on which are disposed two exemplary MB dipoles 110 and eight exemplary C-Band patch antenna elements 115 according to the disclosure. It will be understood that only six of the exemplary C-Band patch antenna elements 115 are visible in FIG. 1A, as two of the patch antennas are positioned below the MB dipoles 110, which are described below. Array portion 100 may serve as a unit cell for a larger antenna array that may have multiple iterations of array portion 100 mounted adjacent to each other along the y-axis (vertical axis) for increased gain and finer beam control for tilting the beam in the vertical plane (defined by the y-axis and z-axis) using a Remote Electrical Tilt mechanism (not shown). Further, multiple array portions 100 may alternately or additionally be mounted adjacent to each other along the x-axis (azimuth axis) to provide for a narrow beam and finer beam steering in the azimuth plane (defined by the x-axis and z-axis). In an exemplary embodiment, the C-Band patch antenna elements 115 may be spaced apart along both the x-axis and the y-axis by 52.5 mm, for example, and the MB dipoles 110 may be spaced apart along both the x-axis and the y-axis by 105 mm, for example.

Figure 1B:
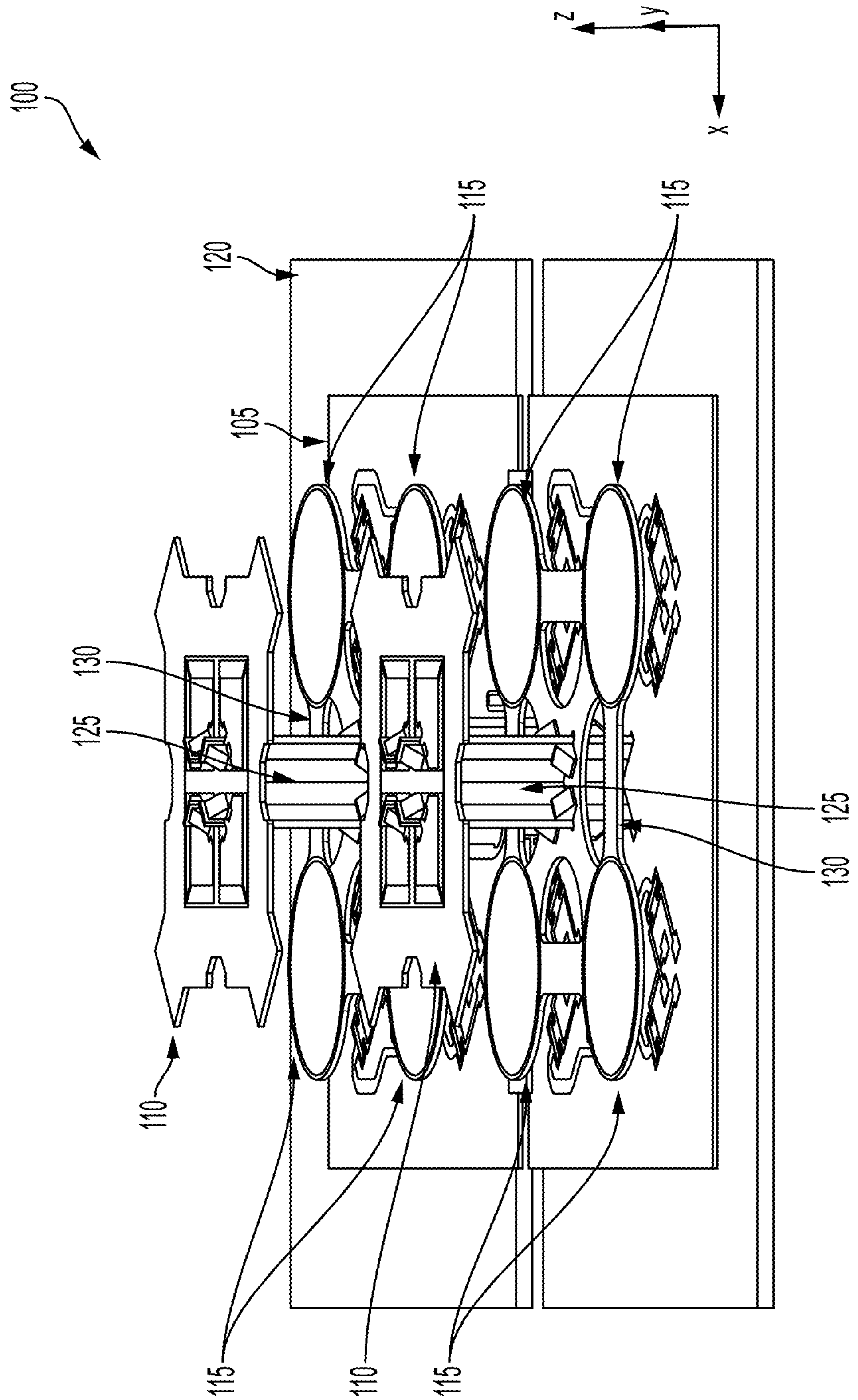
FIG. 1B illustrates the exemplary dual-band antenna array portion of FIG. 1A from along a vertical plane defined by a y-axis and a z-axis.

FIG. 1B illustrates array portion 100 from an angle along the vertical plane defined by the y-axis and z-axis. Shown in FIG. 1B is a reflector 120 on which feed and cavity assembly 105 is disposed. Also visible in FIG. 1B are two balun stems 125, each supporting a corresponding MB dipole 110; and two frames 130, each holding four patch antenna elements 115, and each mechanically supported by a balun stem 125.

Figure 1C:
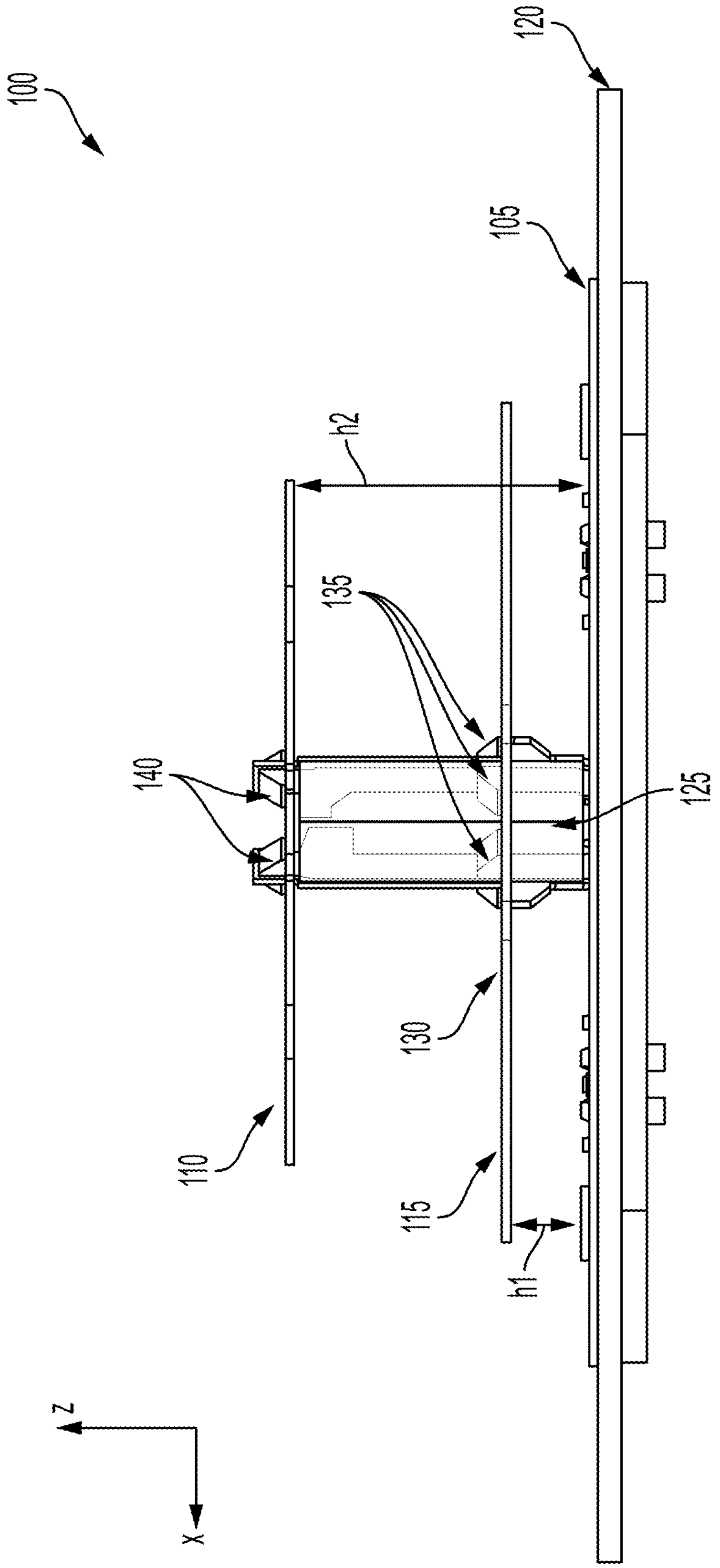
FIG. 1C illustrates the exemplary dual-band antenna array portion along a vertical or y-axis.

FIG. 1C is a side view of array portion 100, as seen along the y-axis (vertical axis). Visible in FIG. 1C are reflector 120 with integrated feed and cavity assembly 105; balun stem 125 that supports MB dipole 110 and also support patch antenna frame 130. Patch antenna frame 130 holds patch antenna elements 115 and mounts to balun stem 125 by support solder joints 135. Support solder joints 135 do not conduct any signal and may mechanically couple patch antenna frame 130 to balun stem 125. MB dipole 110 is both mechanically and electrically coupled to balun stem 125 by signal solder joints 140 and may be mounted at height h2 above reflector 120. Patch antenna frame 130 may be mounted so that patch antenna elements 115 may be elevated above reflector 120 at a height h1. In an exemplary embodiment, h1 may be 8.38 mm, for example, and h2 may be 28.26 mm, for example.

Figure 2:
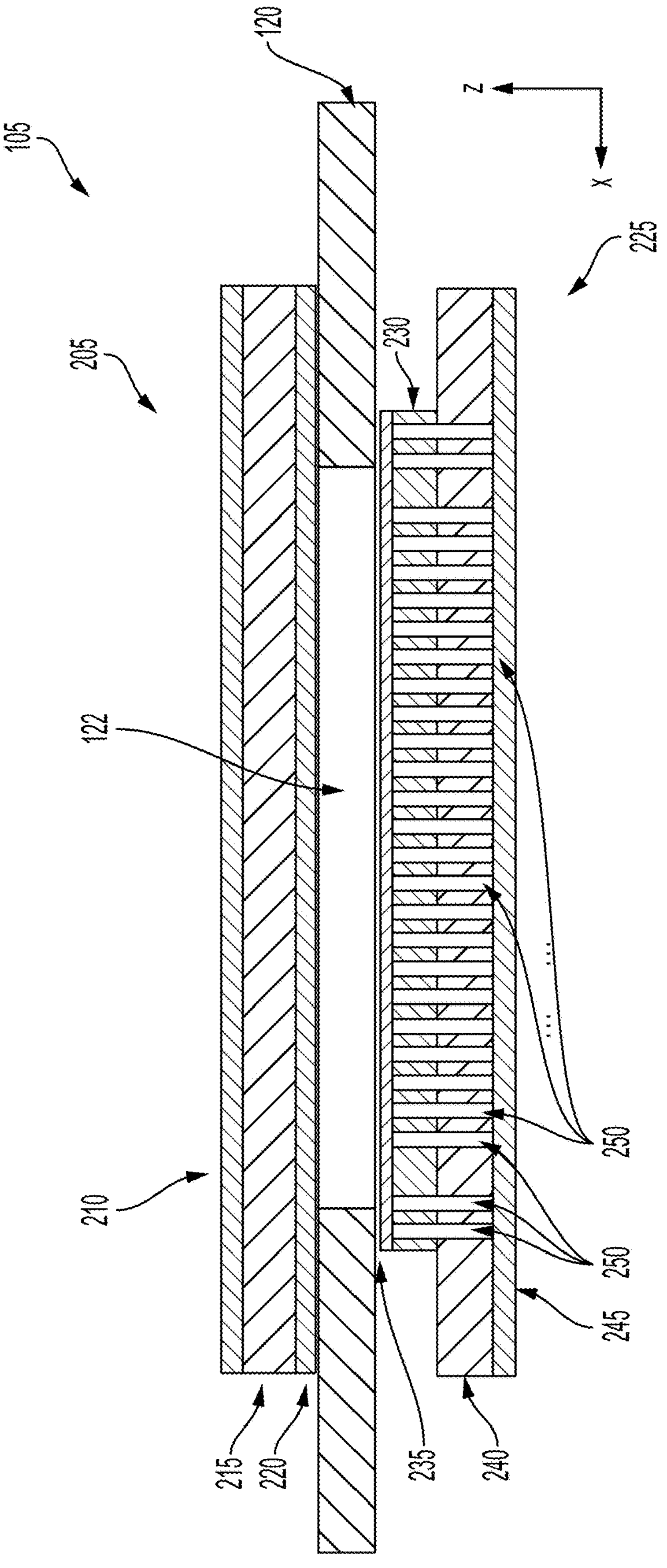
FIG. 2 illustrates an exemplary feed and cavity assembly according to the disclosure, viewed along the vertical y-axis.

FIG. 2 is a cross sectional view of exemplary feed and cavity assembly 105 according to the disclosure. Feed and cavity assembly 105 has two PCB (Printed Circuit Board) structures that are mechanically coupled to reflector 120: an upper PCB structure 205 disposed on an upper surface of reflector 120; and a lower PCB structure 225 disposed on a lower surface of reflector 120. Upper PCB structure 205 has a PCB 215. Disposed on the upper surface of PCB 215 is a feed trace metal layer 210; and disposed on the lower surface of PCB 215 is an aperture metal layer 220. Lower PCB structure 225 has a lower PCB 240 on which is disposed a dielectric cavity cup frame 230 on its upper surface and a lower cavity ground plane layer 245 on its lower surface. Formed within lower PCB 240 and cavity cup frame 230 is a plurality of vias 250. Vias 250 are filled with metal and electrically couple to lower cavity ground plane layer 245. Disposed on top of dielectric cavity cup frame 230 and vias 250 is a solder mask 235, which provides isolation for better performance and mitigation of PIM (Passive InterModulation distortion). It will be understood that the use of "upper," "lower" and "top" is for ease of discussion, and is not necessarily intended to limit the disclosure to relative positions strictly in vertical, horizontal or depth axes.

As illustrated, reflector 120 may have an aperture 122 that exposes upper PCB structure 205 to lower PCB structure 225. The dimensions of aperture 122 may be the same as the inner dimension of cavity cup frame 230.

The structure illustrated in FIG. 2 corresponds to a single patch antenna element 115.

Figure 3B:
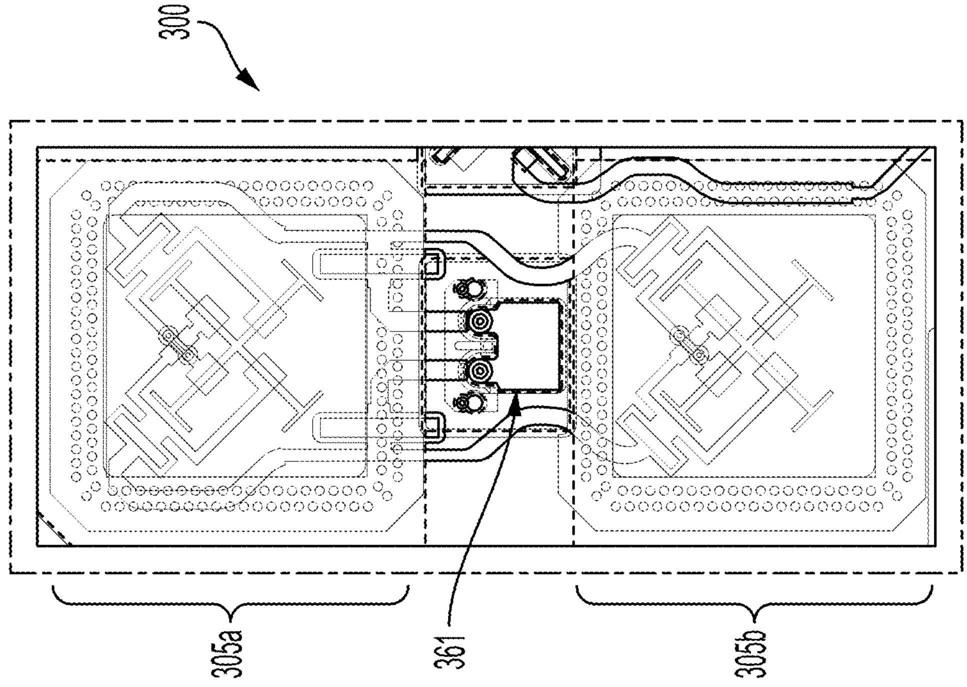
FIG. 3B is a top-down transparent view of an exemplary dual patch C-Band unit cell, shown as one of four such unit cells within the dual-band antenna array portion.
Figure 3A:
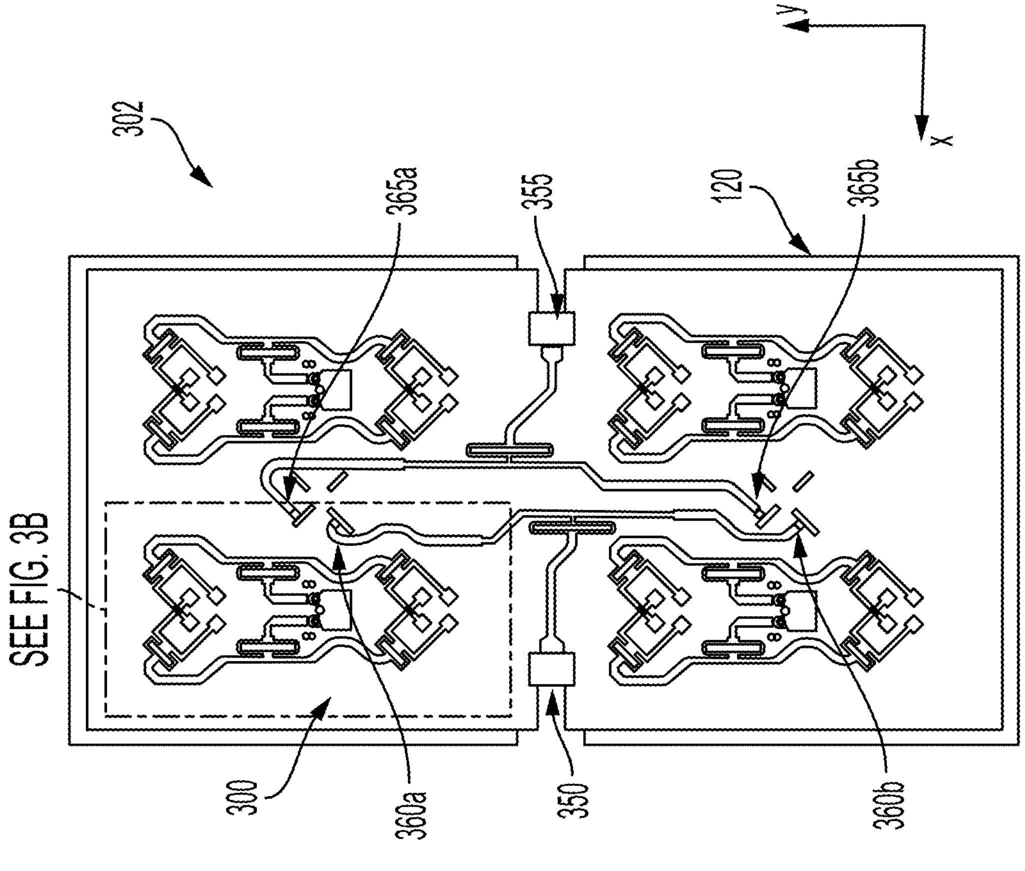
FIG. 3A is a top-down view of the feed circuitry of an exemplary dual-band antenna array portion according to the disclosure.

FIG. 3A is a top-down view of the feed circuitry 302 of an exemplary dual-band antenna array portion 100 according to the disclosure. Array portion 100 has four C-Band unit cells 300, one of which is highlighted by dotted line box A. Feed circuitry 302 also supports two MB dipoles (not shown). MB signal feeds include an MB +45 signal feed 350 that electrically couples to a first MB dipole +45 signal feed 360*a* and a second MB dipole +45 signal feed 360*b*, and an MB −45 signal feed 355 that couples to a first MB dipole −45 signal feed 365*a* and a second MB dipole −45 signal feed 365*b*.

FIG. 3B illustrates the signal and cavity assembly 105 for one C-Band unit cell 300, as broken out from dotted line box A in FIG. 3A. C-Band unit cell 300 is illustrated in FIG. 3B in transparency to show the overlapping structures in signal and cavity assembly 105. C-Band unit cell 300 has a first sub-unit 305*a* corresponding to a first patch antenna element 115 and a second sub-unit 305*b* corresponding to a second patch antenna element 115. The first and second patch antenna elements 115 are fed the same two signals (+/−45 degree polarization) through feeds provided by two RF (Radio Frequency) cables (not shown) that couple at aperture 361 formed in signal and cavity assembly 105 and reflector 120.

Figure 3C:
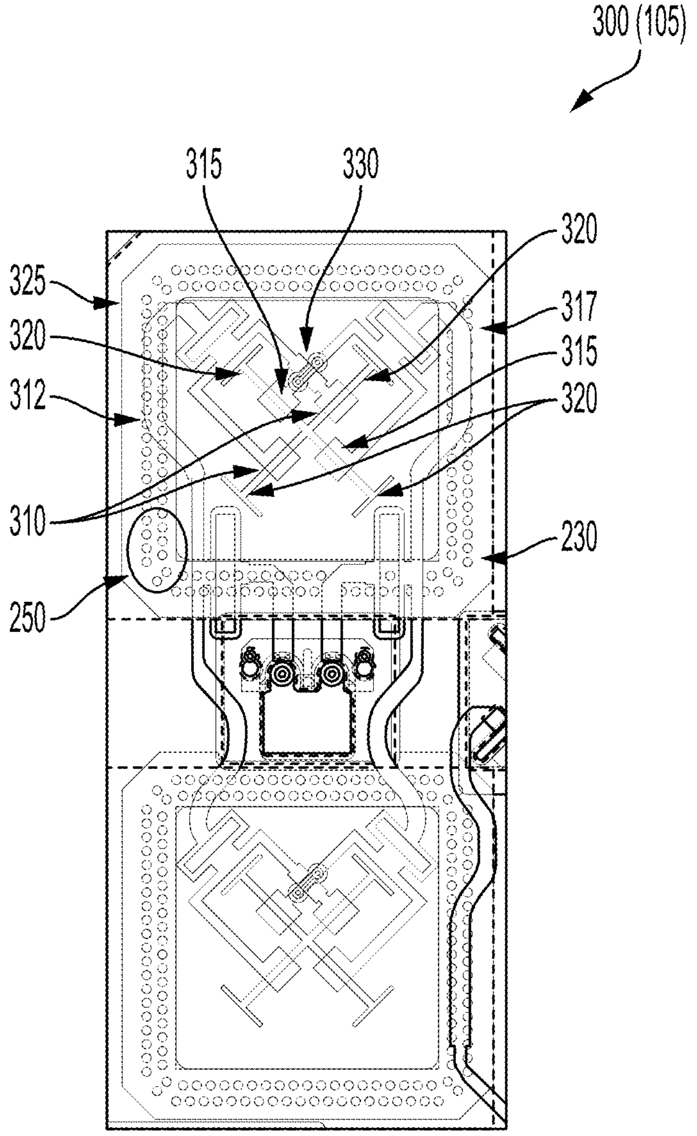
FIG. 3C further illustrates a top-down transparent view of an exemplary dual patch unit cell according to the disclosure.

FIG. 3C is substantially similar to FIG. 3B, showing each constituent layer within feed and cavity assembly 105 superimposed over each other, whereby each layer is also illustrated in cross section in FIG. 2. For the purposes of illustration, the RF feed structure for the first sub-unit 305*a* is described herein. It will be understood that the same description applies to the mirrored feed structure of second sub-unit 305*b*.

The RF signal for a +45 polarization state has a +45 signal feed 312 that splits into two feed branches that terminate in two +45 feed pads 310. Both +45 feed pads 310 are superimposed over the +45 arm of cruciform aperture 320 that is formed in aperture metal layer 220. Similarly, the RF signal for a −45 polarization state has a −45 signal feed 317 that splits into two feed branches that terminate in two −45 feed pads 315. Both −45 feed pads 310 are superimposed over the −45 arm of cruciform aperture 320. The +45 signal feed 312, both +45 feed pads 310, −45 signal feed 317, and both −45 feed pads 315 are formed of metal in feed trace metal layer 210. As illustrated above in FIG. 2, feed trace metal layer 210 and aperture metal layer 220 are respectively disposed on an upper and lower surface of PCB 215, forming upper PCB structure 205.

As illustrated, each of first sub-unit 305*a* and second sub-unit 305*b* has an intersection 330 of two feed branches (one for the +45 signal and the other for the −45 signal) that cross. To accommodate this, a bridge and via structure may be used to pass one of the two signals through a set of vias through PCB 215 and carried briefly through an isolated portion of aperture metal layer 220.

Also shown in FIG. 3C is cavity cup frame 230 and its plurality of vias 250. As discussed above with respect to FIG. 2, cavity cup frame 230 is formed on the underside of reflector 120 and is disposed on the upper surface of lower PCB 240; and metal-filled vias 250 pass through both cavity cup frame 230 and lower PCB 240 to electrically couple with lower cavity ground plane layer 245 that is disposed on the lower surface of lower PCB 240. This structure creates an RF cavity that reflects RF energy (+45 and −45 polarized signals) emitted downward in the negative z-axis direction from aperture metal layer 220 toward lower cavity ground plane layer 245. The cavity formed by cavity cup frame 230, vias 250, and lower cavity ground plane layer 245 reflects the emitted energy upward in the positive z-axis direction, combining with the RF energy emitted in the positive z-direction by aperture metal layer 220 to feed the patch antenna element 115 disposed above the cruciform aperture 320.

Figure 4:
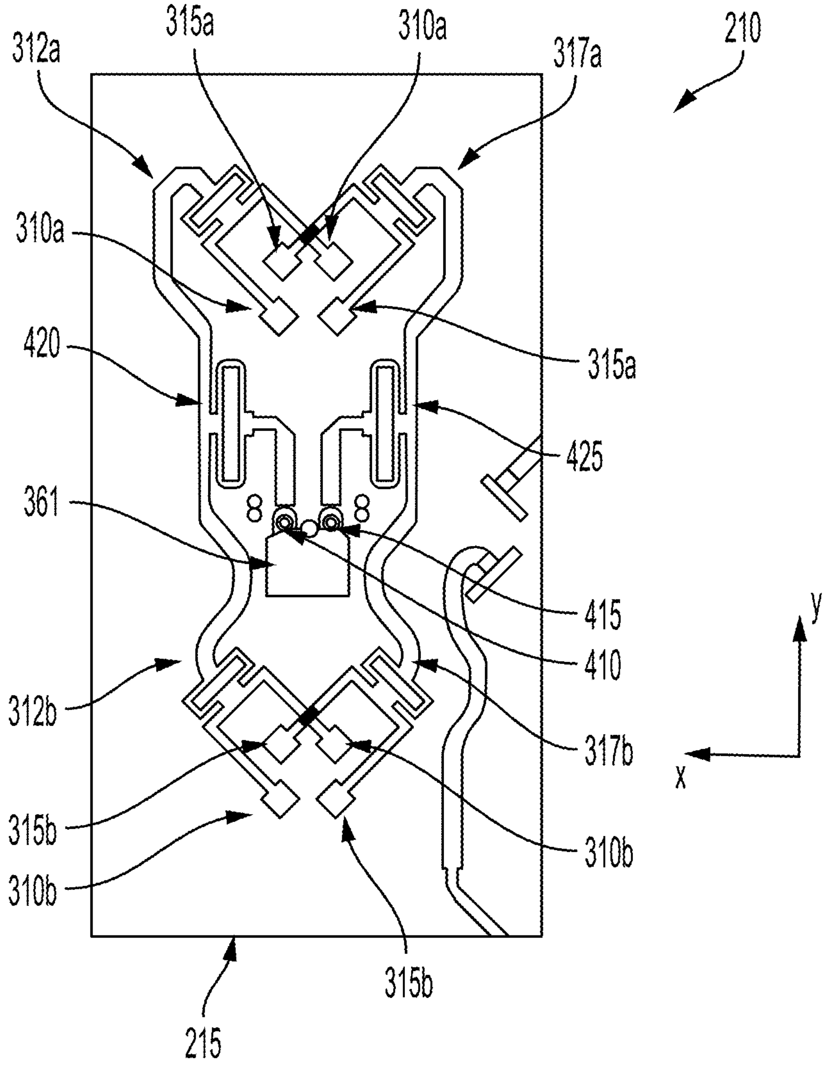
FIG. 4 illustrates an exemplary feed trace layer for the disclosed dual patch unit cell.

FIG. 4 illustrates an exemplary feed trace layer 210 for the disclosed dual patch unit cell 300. The illustrated traces may be formed in a metal layer disposed on an upper surface of PCB 215, which is illustrated as a background to the traces. Illustrated in FIG. 4 is aperture 361 by which two RF cables (not shown) may be connected to couple a +45 RF signal to +45 signal input 410 and a −45 RF signal to −45 signal input 415. The trace from +45 signal input 410 splits at junction 420 and is divided into two +45 signal feeds 312*a* and 312*b*, which respectively couple to +45 feed pads 310*a* and 310*b* as described above with respect to FIG. 3C. Similarly, the trace from −45 signal input 415 splits at junction 425 and is divided into two −45 signal feeds 317*a* and 317*b*, which respectively couple to −45 feed pads 315*a* and 315*b*.

Figure 5:
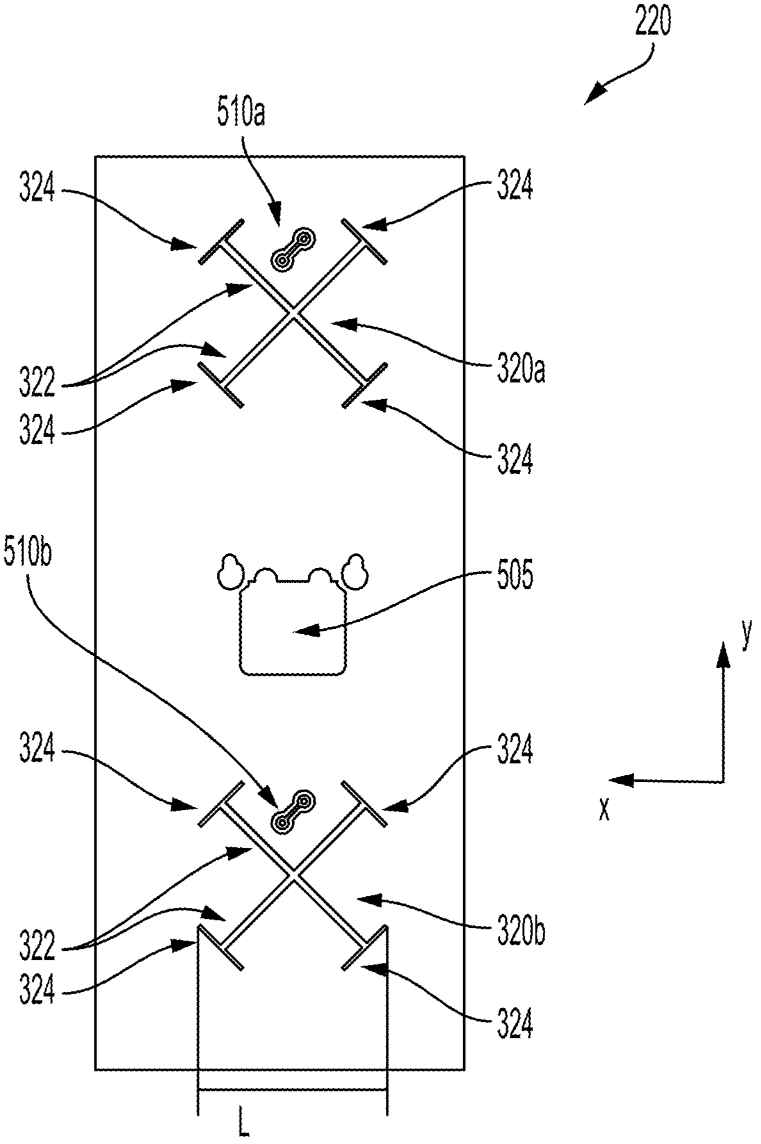
FIG. 5 illustrates an exemplary feed aperture layer for the disclosed dual patch unit cell.

FIG. 5 illustrates an exemplary aperture metal layer 220 according to the disclosure. Aperture metal layer 220 has an aperture 505 for two RF cables (not shown) to pass through for coupling to RF signal inputs 410 and 415 (also not shown). Aperture metal layer 220 has a first cruciform aperture 320*a* corresponding to first sub-unit 305*a* and a second cruciform aperture 320*b* corresponding to a second sub-unit 305*b*. Each cruciform aperture 320*a/b* may have two diagonal arms 322 that have transverse arms 324 at their ends. In an exemplary embodiment, diagonal arms 322 may have a length of 19.4 mm and a width of 0.71 mm. Transverse arms 324 may have a width of 0.34 mm. Transverse arms 324 may have a length such that the distance from their respective furthest ends (dimension L) may be 14.46 mm. Aperture metal layer 220 also has a first signal bridge 510*a* and second signal bridge 510*b*. First signal bridge 510*a* and second signal bridge 510*b* carry the signal trace of one of the signals that would otherwise intersect at intersections 330. In an exemplary embodiment, aperture metal layer 220 may be formed of Copper having a 1.4 mil thickness.

Figure 6:
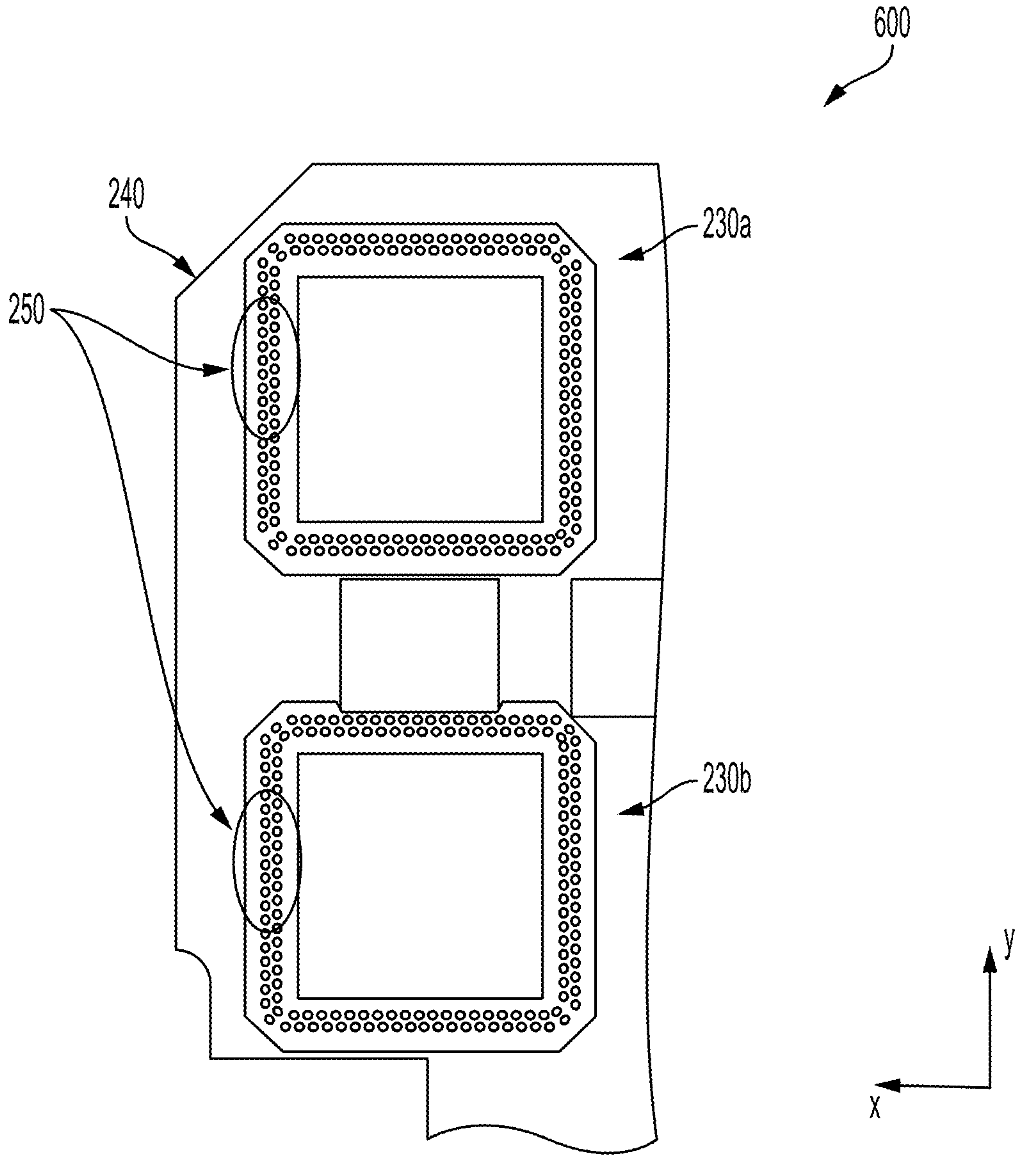
FIG. 6 illustrates an exemplary cavity cup layer for the disclosed dual patch unit cell.

FIG. 6 illustrates an exemplary cavity cup frame layer 600. For the illustrated C-Band unit cell 300, cavity cup frame layer has a first cavity cup frame 230*a* and a second cavity cup frame 230*b*, both of which are disposed on an upper surface of lower PCB 240, and each of which respectively corresponds to sub-unit 305*a* and 305*b*. The use of a high dielectric material in cavity cup frame 230 provides for a cavity that is shallower than could otherwise be employed in the case of a conductive cup frame. In an exemplary embodiment, cavity cup frames 230*a/b* may be formed of an FR4 PCB material with a dielectric constant of 4.2. Also illustrated are vias 250 that are formed within first and second cavity cup frames 230*a/b*. Vias 250 may be arranged in two rows or columns such that the vias within each row/column are offset from each other and alternating.

Figure 7:
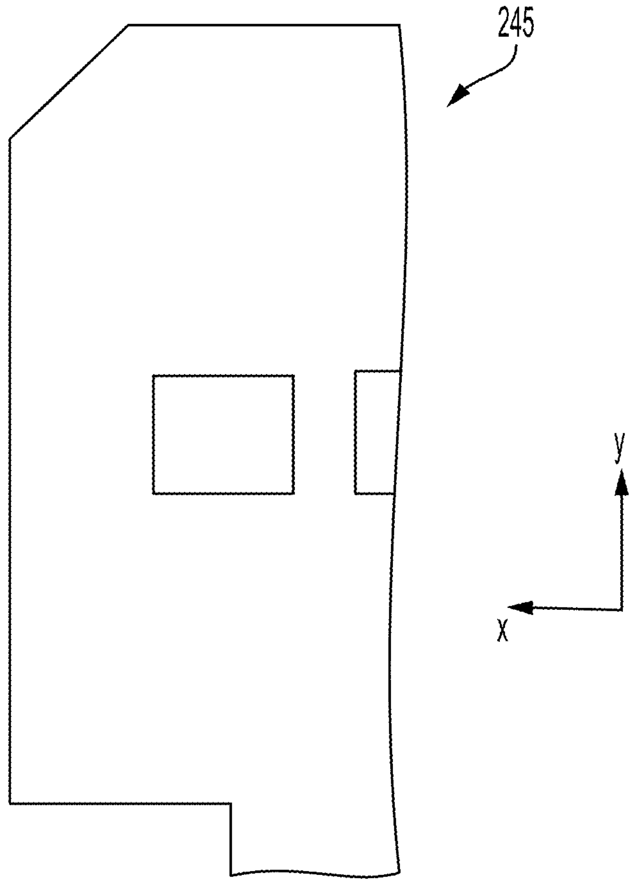
FIG. 7 illustrates an exemplary cavity ground plane layer for the disclosed dual patch unit cell.

FIG. 7 illustrates an exemplary lower cavity ground plane layer 245 for a C-Band unit cell 300 according to the disclosure. Lower cavity ground plane layer 245 is disposed on a lower surface of lower PCB 240. The vias 250 shown in FIG. 6 electrically couple to lower cavity ground plane 245. In an exemplary embodiment, lower cavity ground plane layer 245 may be formed of Copper having a thickness of 1.4 mil.

Figure 8:
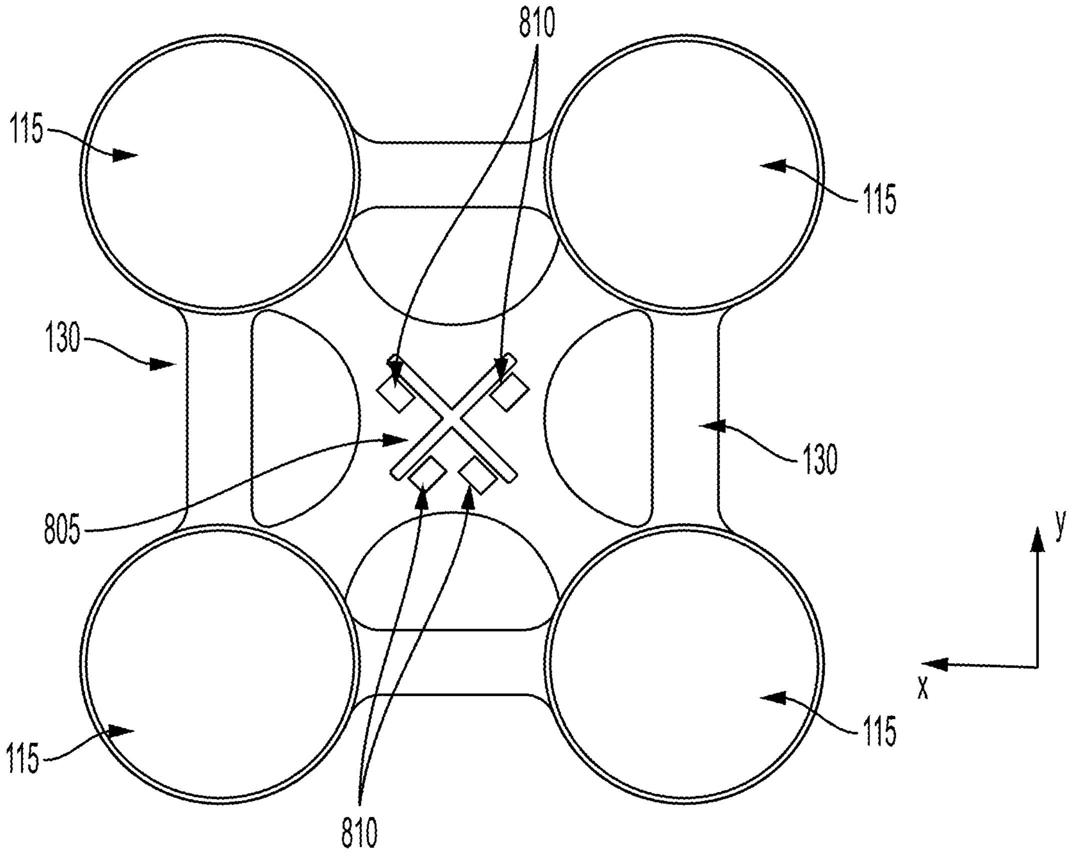
FIG. 8 illustrates an exemplary C-Band patch assembly having four C-Band patches.

FIG. 8 illustrates an exemplary C-Band patch assembly 800 having a patch frame 130 that holds four C-Band patches 115. Patch frame 130 may be formed of a PCB or dielectric that may have a cruciform slot 805 through which balun stem 125 (not shown) may be inserted. Patch frame 130 may also have a plurality of solder points 810 for soldering patch frame 130 to balun stem 125 (not shown). In an exemplary embodiment, patch frame 130 may be formed of a 30 mil DK 4.2 PCB; and C-Band patches 115 may be formed of two Copper layers, each with a thickness of 1.4 mil and have a radius of 14.36 mm. The two Copper layers forming C-Band patch may be disposed above and below patch frame 130 in a sandwich configuration.

Figure 9A:
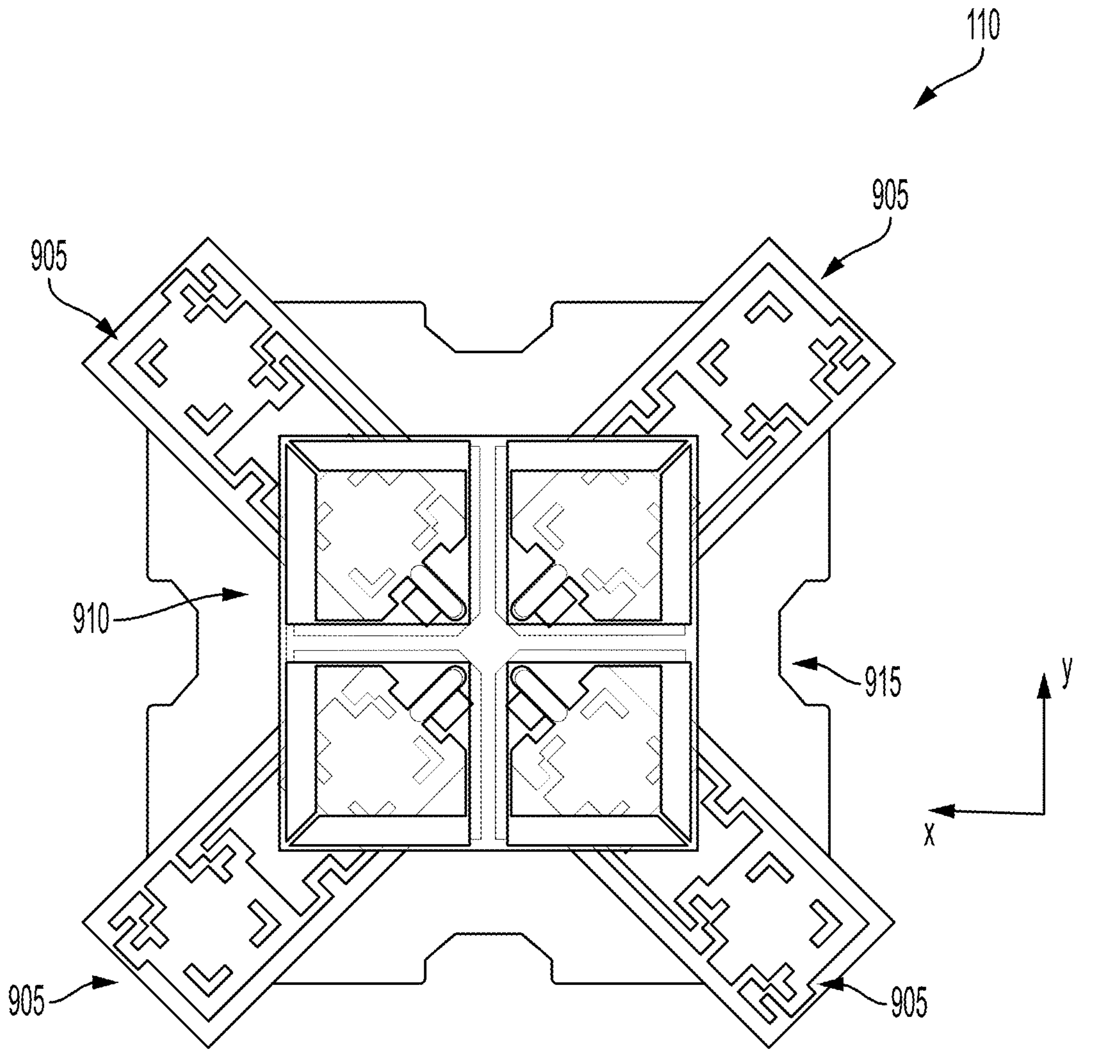
FIG. 9A illustrates an exemplary MB (Mid Band) dipole that may be deployed as part of the exemplary dual-band antenna array portion.

FIG. 9A illustrates an exemplary MB dipole 110 according to the disclosure whereby its frame PCB 915 is shown in transparency to reveal four cloaked dipole arms 905 that are disposed on a lower surface of frame PCB 915, and a second conductor pattern 910 that is formed from a second metal layer on an upper surface of frame PCB 915.

Figure 9B:
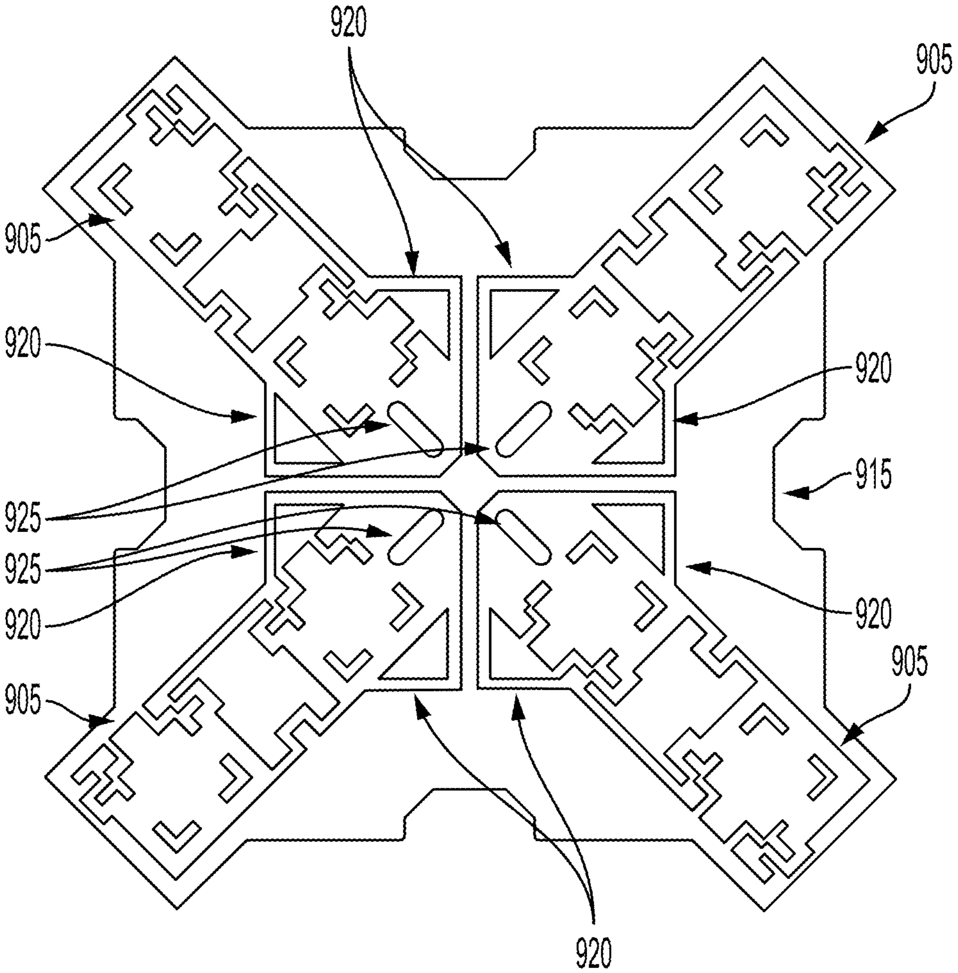
FIG. 9B illustrates a first metal layer pattern for the exemplary MB dipole of FIG. 9A.

FIG. 9B illustrates four cloaked dipole arms 905 that may be formed of a first metal layer disposed on a lower surface of PCB 915. Each of the dipole arms has a capacitive and inductive pattern that renders the dipole arm 905 transparent to C-Band radiation, thereby enabling MB dipoles 110 to be placed in close proximity to C-band patches 115. Each dipole arm 905 also has a wing structure 920, which increases the gain of MB dipole 110 by increasing the volume of each dipole arm 905 but not where it overlaps with C-Band patches 115. PCB 915 and each dipole arm 905 also have a mounting slot 925, through which a portion of balun stem 125 (not shown) may be inserted for supporting PCB 915.

Figure 9C:
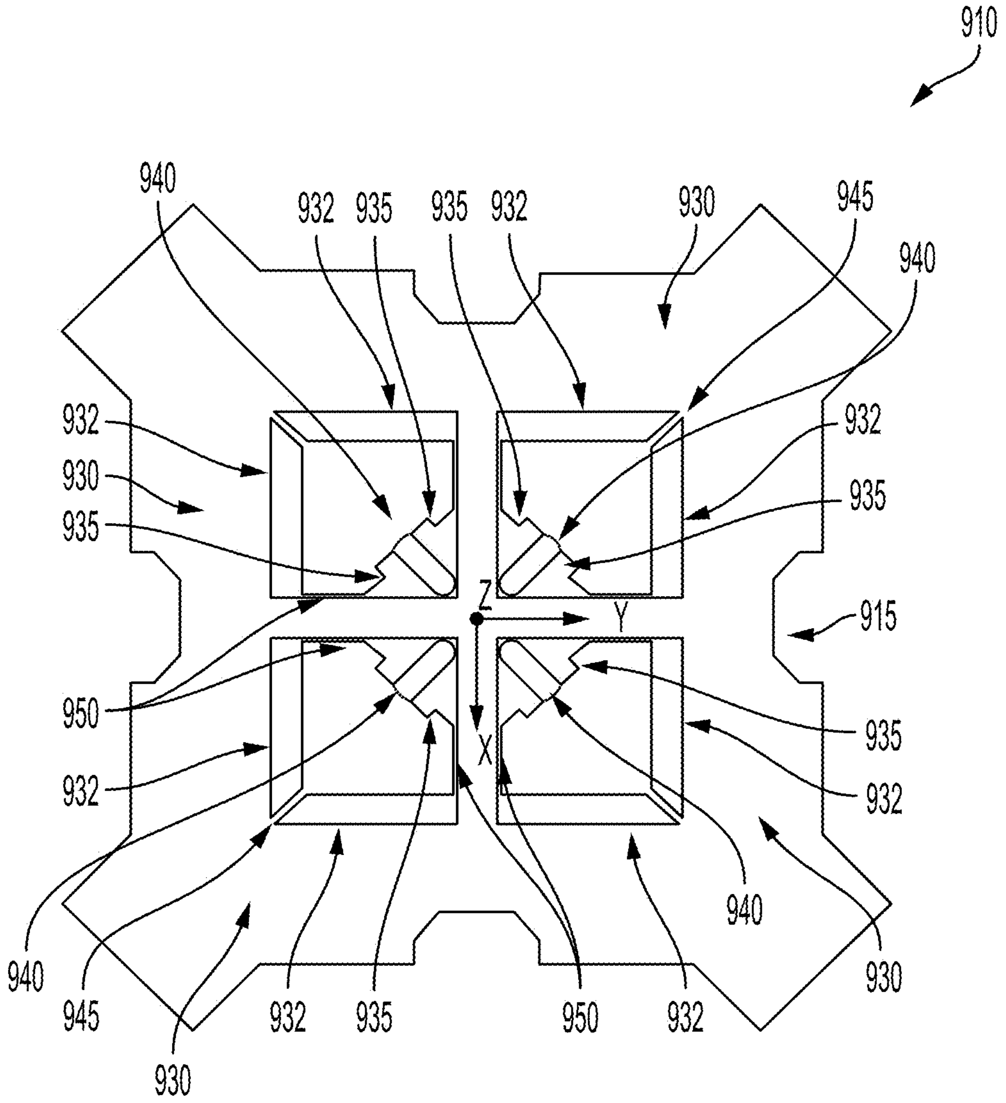
FIG. 9C illustrates a second metal layer pattern for the exemplary MB dipole of FIG. 9A.

FIG. 9C illustrates an exemplary second conductor patterns 910 that may be formed of a single second metal layer that is disposed on an upper surface of frame PCB 915. Second conductor patterns 910 has four secondary wing structures 930, each corresponding to one of the MB dipole arms 905. Each secondary wing structure 930 has two feed pads 935 that surround a slot 940 formed in the PCB through which balun stem 125 (not shown) may be inserted so that a solder joint (not shown) may be formed to electrically couple the balun circuitry of balun stem 125 to their corresponding upper wing structures 930.

Each secondary wing structure 930 has two strip conductors 950, one per feed pad 935, that electrically couples each feed pad 935 to a corresponding secondary wing 932. Accordingly, each secondary wing structure 930 has two secondary wings 932 that are separated by a gap 945. Secondary wings 932 overlap with a corresponding wing structure 920 of respective MB dipole arm 905 so that the RF signal conductively coupled to each secondary wing structure 930 from the balun circuitry disposed on balun stem 125 (not shown), and this RF signal gets capacitively coupled to from each secondary wing structure 930 to its corresponding dipole arm 905 and wing structure 920 through frame PCB 915.

Figure 9D:
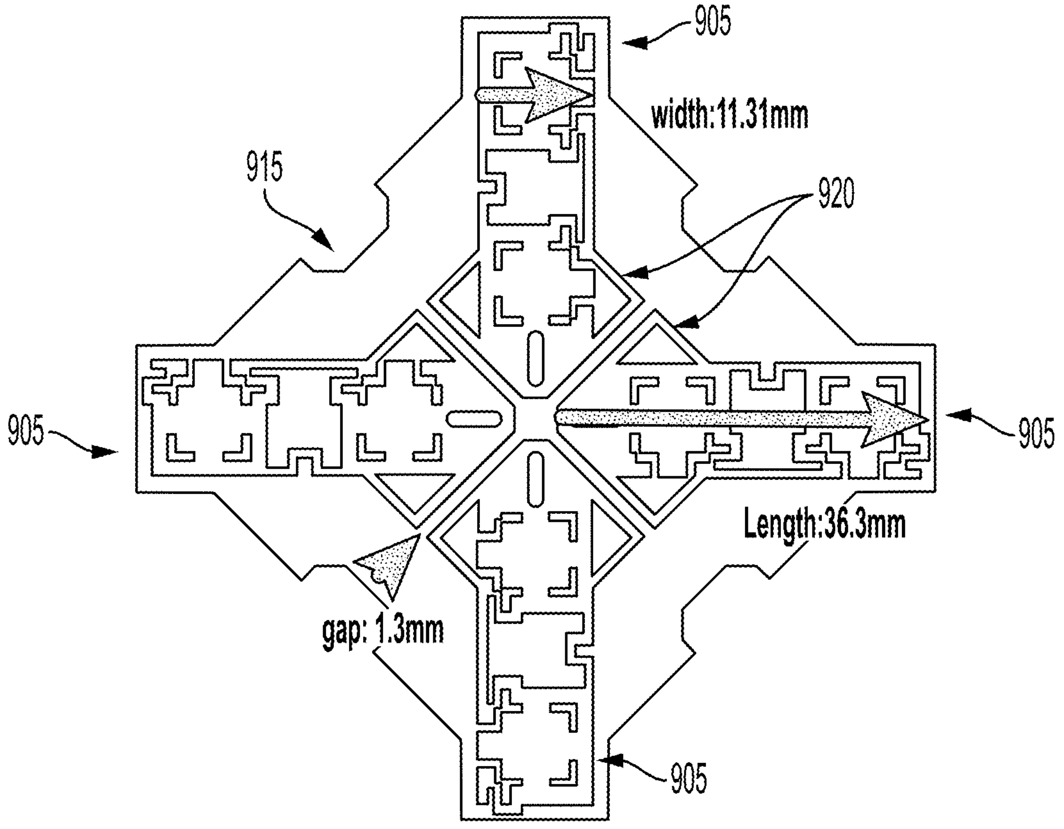
FIG. 9D provides exemplary dimensions for the first metal pattern of FIG. 9B.

FIG. 9D illustrates the four MB dipole arms 905 disposed on the lower surface of frame PCB 915, including example dimensions.

Figure 9E:
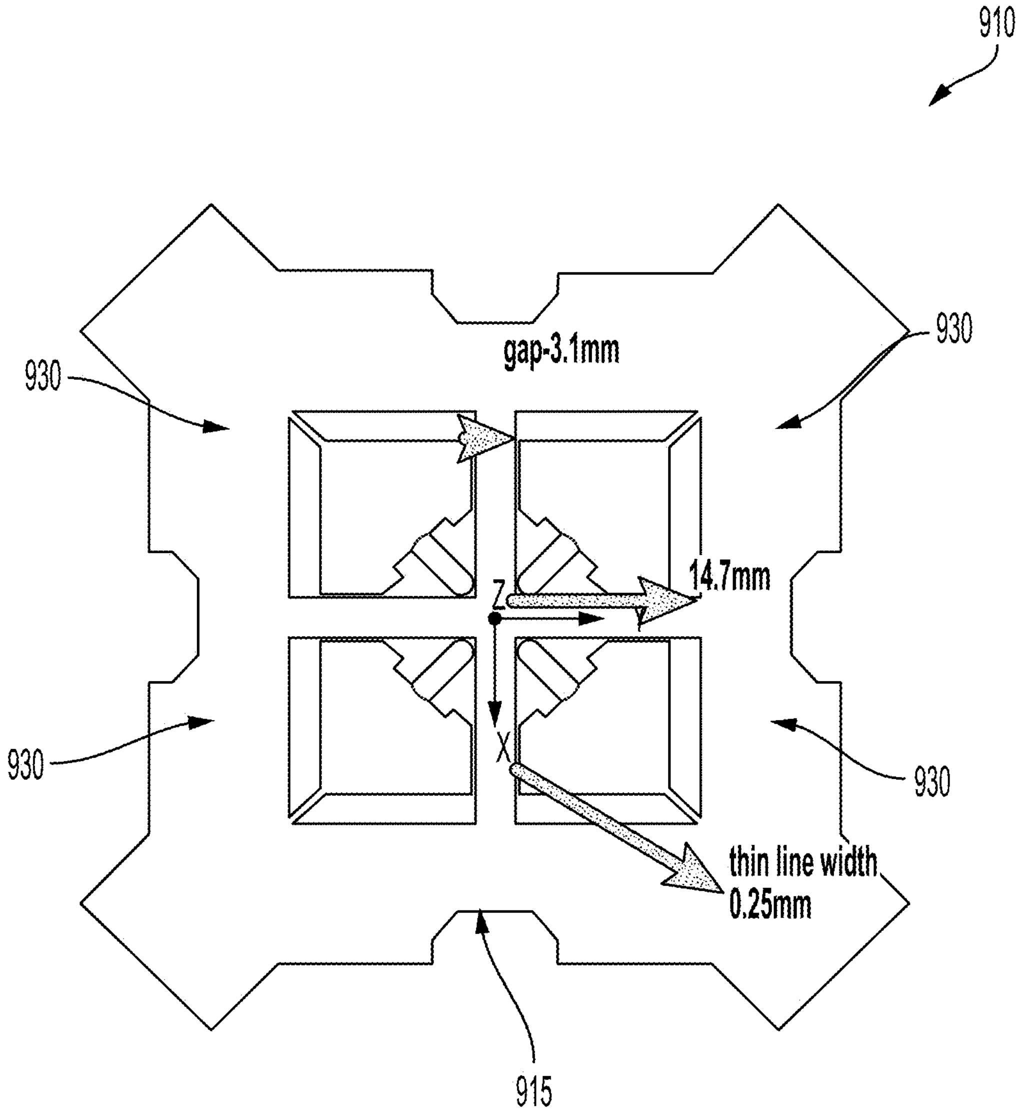
FIG. 9E provides exemplary dimensions for the second metal layer pattern of FIG. 9C.

FIG. 9E illustrates four second conductor patterns 910 that may be formed of a single second metal layer that is disposed on an upper surface of frame PCB 915, along with example dimensions.

What is claimed is:

1. A multiband antenna array, comprising:
a reflector;
a feed and cavity assembly mechanically coupled to the reflector;
a plurality of first dipoles configured to radiate in a first frequency band, the plurality of first dipoles disposed on the feed and cavity assembly; and
a plurality of second dipoles configured to radiate in a second frequency band, the plurality of second dipoles disposed on the feed and cavity assembly, the second frequency band being higher in frequency than the first frequency band,
wherein each of the plurality of second dipoles has a patch antenna element that is disposed over a cruciform aperture, wherein the plurality of second dipoles are arranged in two columns and the plurality of first dipoles are arranged in a column that lies between the two columns of second dipoles.

2. The multiband antenna array of claim 1, wherein each of the plurality of first dipoles comprises:

a first metal layer disposed on a first dipole PCB (Printed Circuit Board), the first metal layer defining four midband dipole arms; and a second metal layer disposed on the first dipole PCB, the second metal layer defining four secondary wing structures, each of the secondary wing structures overlapping a corresponding midband dipole arm.

3. The multiband antenna array of claim 2, wherein each of the four midband dipoles arms comprises a wing structure.

4. The multiband antenna array of claim 3, wherein each of the four secondary wing structures comprises:

two feed pads surrounding a slot;

two secondary wings; and two strip conductors, wherein each of the two strip conductors electrically couples one of the two feed pads to a corresponding one secondary wing.

5. The multiband antenna array of claim 1, wherein the feed and cavity assembly comprises:

a feed trace layer that is disposed on an upper side of an upper PCB;

an aperture metal layer disposed on a lower side of the upper PCB, wherein the cruciform aperture is formed in the aperture metal layer;

a cavity cup frame disposed on an upper side of a lower PCB;

a lower cavity ground plane disposed on a lower side of the lower PCB; and a plurality of vias formed within the cavity cup frame and the lower PCB, wherein the vias are filled with a conductor that is electrically coupled to the lower cavity ground plane.

6. The multiband antenna array of claim 5, wherein the upper PCB is mechanically coupled to an upper surface of the reflector, and wherein the lower PCB is mechanically coupled to a lower surface of the reflector.

7. The multiband antenna array of claim 1, wherein the plurality of second dipoles are arranged in a cluster of four.

8. The multiband antenna array of claim 7, wherein the cluster of four second dipoles are mounted to a dielectric frame that is mechanically coupled to a balun stem.

9. The multiband antenna of claim 8, wherein the balun stem supports one of the plurality of first dipoles.

10. A cellular antenna comprising:

Multiple iterations of the multiband antenna array of claim 1 arranged adjacent to each other.

11. The cellular antenna of claim 10, wherein the multiple iterations of the multiband antenna array are arranged adjacent to one another along a first axis.

12. The cellular antenna of claim 11, wherein the first axis is a vertical axis.

13. The cellular antenna of claim 11, wherein the first axis is an azimuthal axis.

14. The cellular antenna of claim 10, wherein the multiple iterations of the multiband antenna array are arranged adjacent to one another along a first axis and along a second axis.

15. The cellular antenna of claim 14, wherein the first axis is a vertical axis and the second axis is an azimuthal axis.

* * * * *